United States Patent
Cao

(10) Patent No.: US 9,391,733 B2
(45) Date of Patent: Jul. 12, 2016

(54) METHOD, SYSTEM, AND APPARATUS FOR TRANSMITTING DATA INFORMATION BY USING OPTICAL SIGNALS

(71) Applicant: HUAWEI TECHNOLOGIES CO., LTD., Shenzhen (CN)

(72) Inventor: Shiyi Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 14/226,159

(22) Filed: Mar. 26, 2014

(65) Prior Publication Data

US 2014/0205297 A1 Jul. 24, 2014

Related U.S. Application Data

(63) Continuation of application No. PCT/CN2011/080360, filed on Sep. 29, 2011.

(51) Int. Cl.
*H04J 14/00* (2006.01)
*H04J 14/02* (2006.01)

(52) U.S. Cl.
CPC ........... *H04J 14/0227* (2013.01); *H04J 14/026* (2013.01); *H04J 14/0257* (2013.01); *H04J 14/0212* (2013.01); *H04J 14/0224* (2013.01); *H04J 14/0298* (2013.01)

(58) Field of Classification Search
CPC . H04J 14/0227; H04J 14/026; H04J 14/0257; H04J 14/0224; H04J 14/0212; H04J 14/0298
USPC .................................................... 397/43–103
See application file for complete search history.

(56) References Cited

U.S. PATENT DOCUMENTS 5,600,467 A 2/1997 Fee
6,459,832 B1 10/2002 Smith et al.
(Continued)

FOREIGN PATENT DOCUMENTS

CN 1774708 A 5/2006
CN 101702634 A 5/2010
(Continued)

OTHER PUBLICATIONS

Jinno et al, Demonstration of Novel Spectrum Efficient Elastic Optical Path Network with Per Channel Variable Capacity of 40 Gbs to Over 400 Gbs, Sep. 2008, ECOC, Th.3.F.6, pp. 1-2.*
(Continued)

*Primary Examiner* — Ken N Vanderpuye
*Assistant Examiner* — Dibson Sanchez
(74) *Attorney, Agent, or Firm* — Staas & Halsey LLP

(57) ABSTRACT

A method, a system, and an apparatus for transmitting data information by using optical signals are disclosed. The method includes: selecting at least two optical carriers, where the at least two optical carriers correspond to at least two optical frequency slots, and a vacant optical frequency slot or an optical frequency slot occupied by other optical signals exists between the two optical frequency slots; modulating data information onto the at least two optical carriers to form a channel of optical signals, so that the channel of optical signals occupies the at least two optical frequency slots, and a vacant optical frequency slot or an optical frequency slot occupied by other optical signals exists between the two optical frequency slots; and sending the channel of optical signals.

18 Claims, 12 Drawing Sheets

(56) References Cited

U.S. PATENT DOCUMENTS

| | | | |
|---|---|---|---|
| 6,532,320 B1* | 3/2003 | Kikuchi | H04J 14/02 385/15 |
| 6,859,623 B2* | 2/2005 | Le Bouette | H04B 10/296 398/164 |
| 8,078,054 B2* | 12/2011 | Jiang et al. | 398/32 |
| 8,244,141 B2* | 8/2012 | Fu | H04B 10/25137 398/147 |
| 2004/0018018 A1* | 1/2004 | Izadpanah | 398/77 |
| 2004/0114929 A1* | 6/2004 | Madsen | H04J 14/0298 398/79 |
| 2004/0221032 A1 | 11/2004 | Bernstein et al. | |
| 2005/0036734 A1 | 2/2005 | Zami | |
| 2005/0058462 A1* | 3/2005 | Talebpour | H04B 10/508 398/199 |
| 2005/0175035 A1 | 8/2005 | Neely et al. | |
| 2005/0271387 A1* | 12/2005 | Kee | H04B 10/2543 398/140 |
| 2006/0024066 A1* | 2/2006 | Fujiwara | H04B 10/2587 398/183 |
| 2006/0271988 A1 | 11/2006 | Chapman et al. | |
| 2008/0310842 A1 | 12/2008 | Skrobko | |
| 2009/0067843 A1* | 3/2009 | Way et al. | 398/79 |
| 2010/0178057 A1* | 7/2010 | Shieh | 398/79 |
| 2010/0284695 A1* | 11/2010 | Lin | H04B 10/2513 398/81 |
| 2011/0069953 A1 | 3/2011 | Bronstein et al. | |
| 2011/0069975 A1* | 3/2011 | Liu et al. | 398/202 |
| 2011/0131624 A1 | 6/2011 | Wu et al. | |
| 2011/0182584 A1* | 7/2011 | Gottwald et al. | 398/79 |
| 2011/0206376 A1* | 8/2011 | Gottwald | H04B 10/516 398/76 |
| 2012/0201541 A1* | 8/2012 | Patel | H04J 14/0212 398/58 |
| 2012/0251117 A1* | 10/2012 | Patel | H04J 14/0224 398/79 |
| 2012/0281979 A1* | 11/2012 | Xia et al. | 398/25 |
| 2012/0321296 A1* | 12/2012 | Wellbrock et al. | 398/5 |
| 2012/0321306 A1* | 12/2012 | Wellbrock et al. | 398/48 |
| 2012/0328296 A1* | 12/2012 | Sullivan | H04J 14/026 398/79 |
| 2013/0058648 A1* | 3/2013 | Ji et al. | 398/38 |

FOREIGN PATENT DOCUMENTS

| | | |
|---|---|---|
| CN | 101997725 A | 3/2011 |
| CN | 102082684 A | 6/2011 |
| EP | 1 701 462 B1 | 6/2007 |
| WO | 2008/112685 A1 | 9/2008 |
| WO | 2011/031831 A1 | 3/2011 |
| WO | 2011/035680 A1 | 3/2011 |

OTHER PUBLICATIONS

Chinese Office Action issued May 14, 2014 in corresponding Chinese Patent Application No. 201180002454.7.

Form PCT/ISA/210 issued Nov. 17, 2011 in corresponding PCT Application PCT/CN2011/082368.

IEEE Computer Society "Part 3: Carrier Sense Multiple Access with Collision Detection (CSMA/CD) Access Method and Physical Layer Specifications" Amendment 1: Physical Layer Specifications and Management Parameters for 10 Gb/s Passibe Optical Networks; IEEE Standard for Information Technology-Telecommunications and information exchange between systems-Local and metropolitan area networks-Specific Requirements, IEEE Std. 802.3av-2009, pp. 1-214.

"Data Over Cable Service Interface Specifications Docsis 3.0 Physical Layer Specification" CM-SP-PHYv3.0-I08-090121, pp. 1-161.

LAN/MAN Standards Committee of the IEEE Computer Society "Part 3: Carrier Sense Multiple Access with Collision Detection (CSMA/CD) Access Method and Physical Layer Specifications" Amendment 1: Physical Layer Specifications and Management Parameters for 10 Gb/s Passibe Optical Networks; IEEE Standard for Information Technology-Telecommunications and information exchange between systems-Local and metropolitan area networks-Specific Requirements, IEEE Std. 802.3av-2009, Jun. 9, 2005, pp. 1-594.

Part 3: Carrier Sense Multiple Access with Collision Detection (CSMA/CD) access method and physical layer specifications IEEE Standard for Information Technology-Telecommunications and information exchange between systems-Local and metropolitan area networks-Specific Requirements; Section Five, pp. 1-417.

Jinno et al., "Spectrum-Efficient and Scalable Elastic Optical Path Network: Architecture, Benefits, and Enabling Technologies", *IEEE Communications Magazine, Topics in Optical Communications*, Nov. 2009, pp. 66-73.

Hussain et al., "Generalized Label for Super-Channel Assignment on Flexible Grid draft-hussain-ccamp-super-channel-label-00.txt", Memo of the *Network Working Group*, Jul. 25, 2011, pp. 1-15, Infinera.

Extended European Search Report mailed Aug. 28, 2014, in corresponding European Patent Application No. 11864805.4.

"ITU-T Recommendation G.694.1 (Jun. 2002)", Recommendation for *Series G: Transmission Systems and Media, Digital Systems and Networks Transmission media characteristics—Characteristics of optical components and subsystems*, 2002, 12pp., International Telecommunication Union.

"ITU-T Recommendation G.694.2 (Jun. 2002)", Recommendation for *Series G: Transmission Systems and Media, Digital Systems and Networks Transmission media characteristics — Characteristics of optical components and subsystems*, 2002, 12pp., International Telecommunication Union.

Fan Cao et al., "Experimental research on crosstalk in a spectrum-spliced DWDM passive optical network", *Journal of Optoelectronics Laser*, Aug. 2009, 9 pp., vol. 20, No. 8, School of Information and Communication Engineering, Beijing University of Posts and Telecommunications, Beijing, China.

International Search Report issued Jul. 5, 2012, in corresponding International Patent Application No. PCT/CN2011/080360.

* cited by examiner

METHOD, SYSTEM, AND APPARATUS FOR TRANSMITTING DATA INFORMATION BY USING OPTICAL SIGNALS

CROSS-REFERENCE TO RELATED APPLICATIONS

This application is a continuation of International Application No. PCT/CN2011/080360, filed on Sep. 29, 2011, which is hereby incorporated by reference in its entirety.

TECHNICAL FIELD

The present invention relates to communications technologies, and in particular, to a method, a system, and an apparatus for transmitting data information by using optical signals.

BACKGROUND

On an existing wavelength division multiplexing (Wavelength Division Multiplexing, WDM) network, center frequencies of optical signals with different wavelengths are distributed according to a fixed optical frequency grid (Optical Frequency Grid, OFG). Refer to FIG. 1, in which a commonly used 50 GHz grid (Grid) on an existing WDM network is taken as an example. Regardless of whether a bit rate of signals is 100 Gbit/s, 40 Gbit/s, or 10 Gbit/s, center frequencies of the signals are distributed strictly according to the 50 GHz grid.

As data traffic rapidly increases, a bit rate of signals on the WDM network further increases to 400 Gbit/s, or even to 1 Tbit/s. A signal spectrum width of these high rate signals may exceed 50 GHz. As a result, these signals cannot be transmitted on a network that is designed according to a fixed 50 GHz grid. In this case, a feasible method is to use a grid with a wider spacing, such as a 100 GHz grid. However, if hybrid transmission needs to be performed for both relatively low rate signals and high rate signals, the relatively low rate signals may also occupy a 100 GHz optical frequency slot (Optical Frequency Slot, OFS), which wastes spectrum resources in an optical fiber.

Currently, a flex grid (Flex Grid) technology is used in the prior art, which allows a channel of optical signals to occupy multiple consecutive OFSs. Refer to FIG. 2, in which signals with a bit rate of 100 Gbit/s occupy a spectral bandwidth of 50 GHz, signals with a bit rate of 400 Gbit/s occupy spectral bandwidths of 75 GHz to 87.5 GHz, and signals with a bit rate of 1 Tbit/s occupy spectral bandwidths of 150 GHz to 200 GHz. A specific implementation method may be as follows: 12.5 GHz is used as an OFS unit, signals with the bit rate of 100 Gbit/s occupy 4 consecutive OFS units, signals with the bit rate of 400 Gbit/s occupy 6 to 7 consecutive OFS units, and signals with the bit rate of 1 Tbit/s occupy 12 to 16 consecutive OFS units.

In the flex grid technology, the OFSs occupied by a channel of optical signals are consecutive and concatenated, that is, they are connected together. For example, this may be seen from a schematic diagram of an optical signal spectrum on an existing flex grid network, as shown in the FIG. 3. After cross transmission is performed through multiple nodes during network transmission, a large number of OFS fragments are generated, which causes messy distribution of an optical signal spectrum in an optical fiber and reduces the utilization of spectrum resources.

SUMMARY

Embodiments of the present invention provide a method, a system, and an apparatus for transmitting data information by using optical signals so as to solve the problems in the prior art that messy distribution of an optical signal spectrum in an optical fiber is caused and the utilization of spectrum resources is reduced due to a large number of OFS fragments that are generated in cross transmission of optical signals through multiple nodes on a transmission network.

To solve the technical problems, according to one aspect of the present invention, a method for transmitting data information is provided, including: selecting at least two optical carriers, where the at least two optical carriers correspond to at least two optical frequency slots, and a vacant optical frequency slot or an optical frequency slot occupied by other optical signals exists between the two optical frequency slots; modulating data information onto the at least two optical carriers to form a channel of optical signals, so that the channel of optical signals occupies the at least two optical frequency slots, and a vacant optical frequency slot or an optical frequency slot occupied by other optical signals exists between the two optical frequency slots; and sending the channel of optical signals.

According to another aspect of the present invention, a method for receiving data information is provided, including: receiving a channel of optical signals, where the channel of optical signals occupies at least two optical frequency slots, and a vacant optical frequency slot or an optical frequency slot occupied by other optical signals exists between the two optical frequency slots; generating multiple channels of optical sub-signals from the channel of optical signals according to the optical frequency slots occupied by the channel of optical signals; and demodulating data information from the multiple channels of optical sub-signals.

According to another aspect of the present invention, a sending node is provided, including an optical carrier source, a data modulation module, and a sending module, where the optical carrier source includes a carrier generation module and a first optical carrier selection module, where the carrier generation module is configured to generate multiple optical carriers, and the first optical carrier selection module is configured to select at least two optical carriers from the multiple optical carriers, where the at least two optical carriers correspond to at least two optical frequency slots, and a vacant optical frequency slot or an optical frequency slot occupied by other optical signals exists between the two optical frequency slots; the data modulation module is configured to modulate data information onto the at least two optical carriers to form a channel of optical signals, so that the channel of optical signals occupies the at least two optical frequency slots, and a vacant optical frequency slot or an optical frequency slot occupied by other optical signals exists between the two optical frequency slots; and the sending module is configured to send the channel of optical signals.

According to another aspect of the present invention, a receiving node is provided, including: a receiving module, configured to receive a channel of optical signals, where the channel of optical signals occupies at least two optical frequency slots, and a vacant optical frequency slot or an optical frequency slot occupied by other optical signals exists between the two optical frequency slots; an optical sub-signal generation module, configured to generate multiple channels of optical sub-signals from the channel of optical signals according to the optical frequency slots occupied by the channel of optical signals; and a data restoration module, configured to demodulate data information from the multiple channels of optical sub-signals.

According to another aspect of the present invention, a system for transmitting data information is provided, including the sending node and the receiving node.

As can be seen from the above, in an implementation manner of the embodiments of the present invention, a spectrum corresponding to a channel of optical signals occupies at least two optical frequency slots (OFS), and a vacant OFS or an OFS used by other optical signals exists between the two OFSs. In this case, after cross transmission is performed through multiple nodes on a transmission network, flexible arrangement may be performed according to the size of an OFS block, so that spectra in an optical fiber are arranged closely, thereby reducing OFS fragments, and increasing the utilization of the spectra in the optical fiber.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes in detail a method, an apparatus, and a system for transmitting data information by using optical signals.

Figure 1:
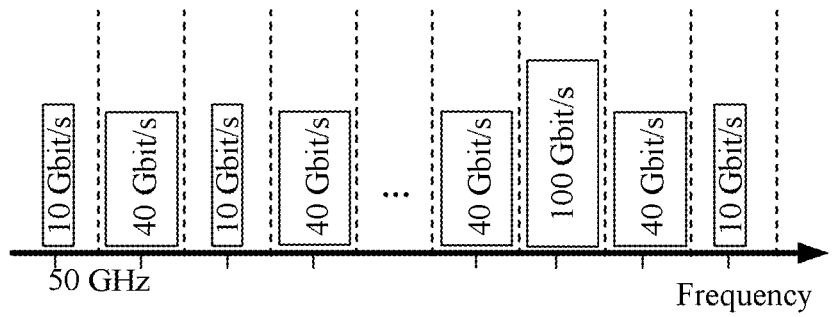
FIG. 1 is a schematic diagram of a fixed grid on an existing WDM network.
Figure 2:
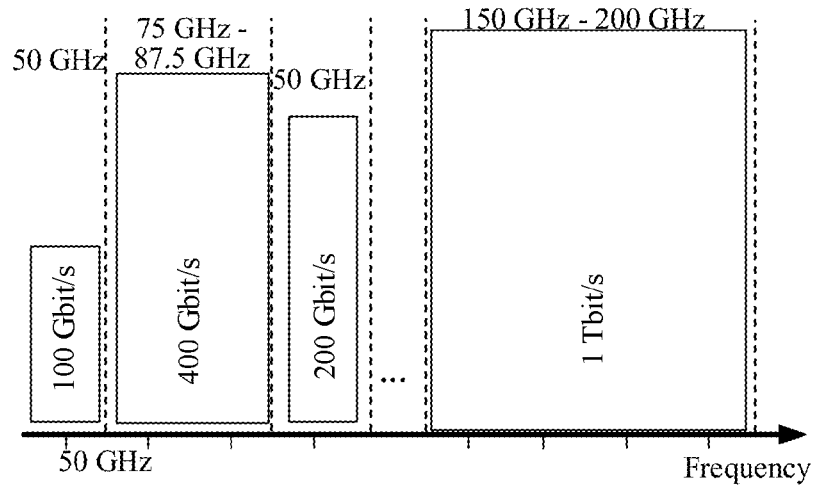
FIG. 2 is a schematic diagram of a flex grid on an existing WDM network.
Figure 3:
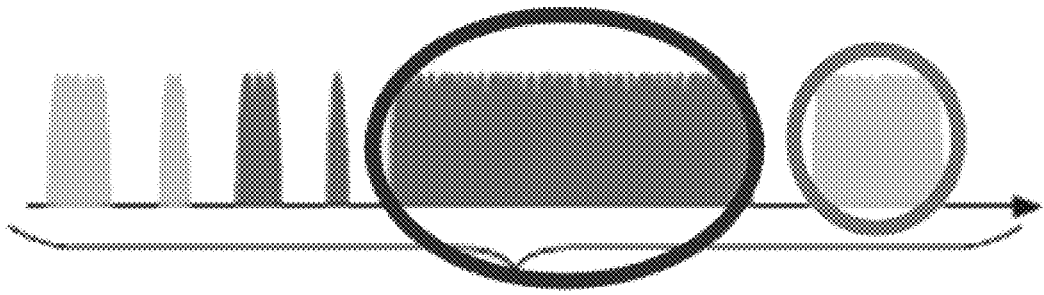
FIG. 3 is a schematic diagram of an optical signal spectrum on an existing flex grid network.
Figure 4:
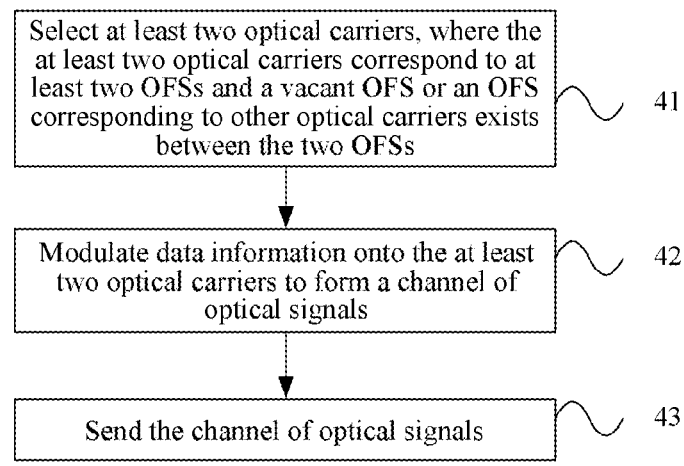
FIG. 4 is a flowchart of an embodiment of a method for transmitting data information by using optical signals according to the present invention.

Therefore, according to an embodiment of the present invention, a method for transmitting data information is provided. FIG. 4 shows a flowchart of the method. The method includes the following steps:

Step 41: Select at least two optical carriers, where the at least two optical carriers correspond to at least two optical frequency slots (OFS), and a vacant OFS or an OFS occupied by other optical signals exists between the two OFSs.

For example, an optical carrier source may first generate multiple optical carriers, OFSs corresponding to the multiple optical carriers are consecutive and concatenated, and at least two optical carriers are selected from the multiple optical carriers. The at least two optical carriers correspond to at least such two OFSs that a vacant OFS or an OFS occupied by other optical signals exists between the two OFSs.

Step 42: Modulate data information onto the at least two optical carriers to form a channel of optical signals, so that the channel of optical signals occupies the at least two OFSs, and a vacant OFS or an OFS occupied by other optical signals exists between the two OFSs.

In this embodiment of the present invention, the channel of optical signals is described from the point of integrity of data information, and only data information that is borne over valid carriers corresponding to the channel of optical signals and combined together is complete data information. Taking orthogonal frequency division multiplexing (orthogonal frequency division multiplexing, OFDM) signals as an example, if any carrier of the signals is missed, a receiving end cannot receive the correct and complete data information. Therefore, the valid carriers corresponding to the channel of optical signals are not necessarily transmitted through a same path or optical fiber, but may be transmitted through different paths or optical fibers and then received together at the receiving end. In this case, only the data information that is borne over the valid carriers and combined together is the complete data information. Optical signals in this case may also be referred to as a channel of optical signals.

The OFSs occupied by the channel of optical signals may be single OFSs that are separated from each other, or may be consecutive and concatenated optical frequency slot blocks.

Figure 5:
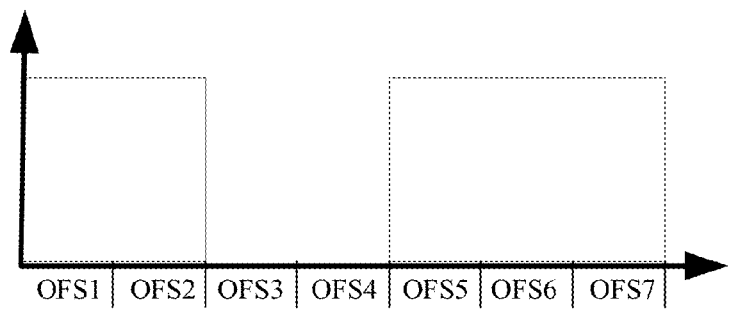
FIG. 5 is a schematic diagram of a spectrum of optical frequency slots occupied by a channel of optical signals according to an embodiment of the present invention.

For example, as shown in FIG. 5, a spectrum of a formed channel of optical signals occupies a total of five OFSs: OFS1, OFS2, OFS5, OFS6, and OFS7. As can be seen from FIG. 5, the spectrum of the channel of optical signals is not consecutive, and two spacing OFSs, OFS3 and OFS4, exist in this spectrum. OFS3 and OFS4 may be vacant, or may be used to bear another channel of optical signals. However, consecutive and concatenated OFS blocks, OFS1-OFS2 and OFS5-OFS7, also exist in this spectrum.

In the process of using multiple optical carriers to generate a channel of optical signals, selection of each optical carrier may be controlled by acquiring instruction information from an interface of a control/management plane, so as to adjust the OFSs occupied by the channel of optical signals to ensure that the channel of optical signals occupies such two OFSs that a vacant OFS or an OFS used by other optical signals exists between the two OFSs. The instruction information may be modulated, together with data information that needs to be transmitted, onto an optical carrier for transmission, or may be transmitted by using an independent carrier.

Step 43: Send the channel of optical signals.

According to an implementation manner, cross transmission may be performed for the channel of optical signals and optical signals formed by optical carriers onto which other data information is modulated, that is, multiple channels of optical signals that include the channel of optical signals may be combined. During the combination, the channel of optical signals obtained in the preceding embodiment occupies at least two OFSs, and a vacant OFS or an OFS used by other optical signals exists between the two OFSs. Therefore, during the transmission, cross transmission may be performed for the channel of optical signals and optical signals formed by optical carriers onto which other data information is modulated. In this case, flexible arrangement may be performed according to the size of an OFS block, so that spectra in an optical fiber are arranged closely, thereby reducing OFS fragments, and increasing the utilization of the spectra in the optical fiber.

Figure 6A:
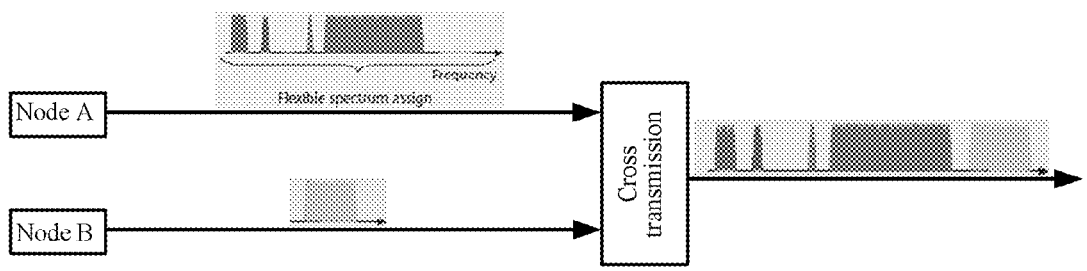
FIG. 6a is a schematic diagram of cross transmission on a transmission network in the prior art.
Figure 6B:
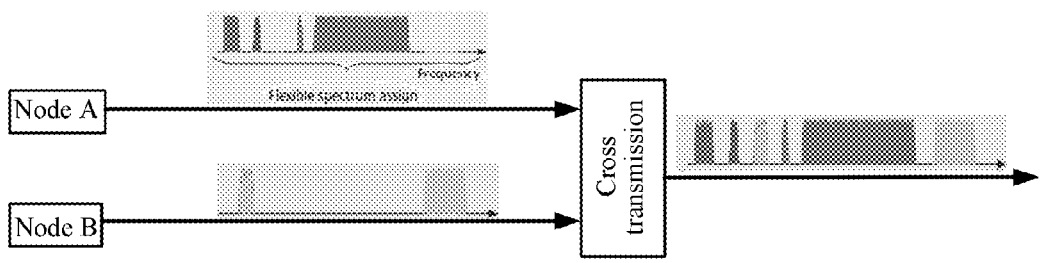
FIG. 6b is a schematic diagram of cross transmission on a transmission network according to an embodiment of the present invention.

Referring to FIG. 6*a* and FIG. 6*b*, FIG. 6*a* is a schematic diagram of a combination situation of cross transmission during transmission of optical signals in the prior art. Multiple channels of optical signals output from a node A and a channel of optical signals output from a node B need to be combined. OFSs occupied by the channel of optical signals output from the node B are consecutive and concatenated, and the spectrum width is large. Therefore, the OFSs cannot be inserted in the spectrum gap of the multiple channels of optical signals output from the node A, but can only be arranged in sequence. As a result, utilization of spectrum resources in an optical fiber after the combination is relatively low.

Refer to FIG. 6*b*, which is a schematic diagram of a combination situation of cross transmission during transmission of optical signals according to an embodiment of the present invention. Multiple channels of optical signals (which are optical signals after the multiple channels of optical signals are combined) output from a node A and a channel of optical signals output from a node B need to be combined. The channel of optical signals output from the node B may be borne over two OFS blocks according to spectrum distribution of the multiple channels of optical signals output from the node A, where a vacant OFS or an OFS used by other optical signals exists between the two OFS blocks and each OFS block is relatively small. In this case, one of the OFS blocks can be inserted between OFS blocks corresponding to the multiple channels of optical signals output from the node A, thereby reducing OFS fragments and increasing the utilization of the spectrum effectively.

A person skilled in the art should understand that on a transmission network, if all optical signals are the channel of optical signals (that is, a spectrum corresponding to the channel of optical signals occupies at least two OFSs, and a vacant OFS or an OFS used by other optical signals exists between the two OFSs) or a part of optical signals are the channel of optical signals, flexible arrangement may be performed according to the size of an OFS block during the cross transmission, so that spectra in an optical fiber are arranged closely, thereby reducing OFS fragments to an extremely low level, and increasing the utilization of the spectra significantly. Here, the OFS block is a set of several OFSs, and the OFSs in this set are consecutive and concatenated.

Figure 7:
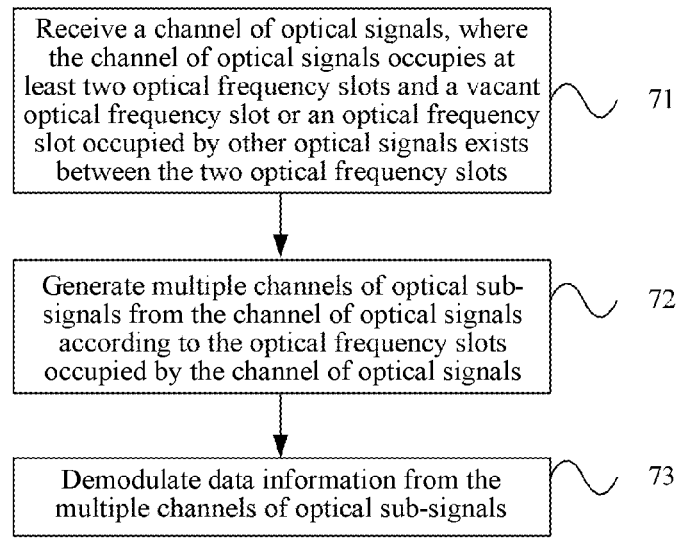
FIG. 7 is a flowchart of an embodiment of a method for transmitting data information by using optical signals according to the present invention.

According to another embodiment of the present invention, a method for receiving data information is provided. FIG. 7 shows a flowchart of the method. The method includes the following steps:

Step 71: Receive a channel of optical signals, where the channel of optical signals occupies at least two optical frequency slots, and a vacant optical frequency slot or an optical frequency slot occupied by other optical signals exists between the two optical frequency slots.

Step 72: Generate multiple channels of optical sub-signals from the channel of optical signals according to the optical frequency slots occupied by the channel of optical signals.

A person skilled in the art should know that receiving the channel of optical signals may have an incoherent reception situation and a coherent reception situation. In this embodiment, processing methods in the incoherent reception situation and in the coherent reception situation are different.

Figure 8A:
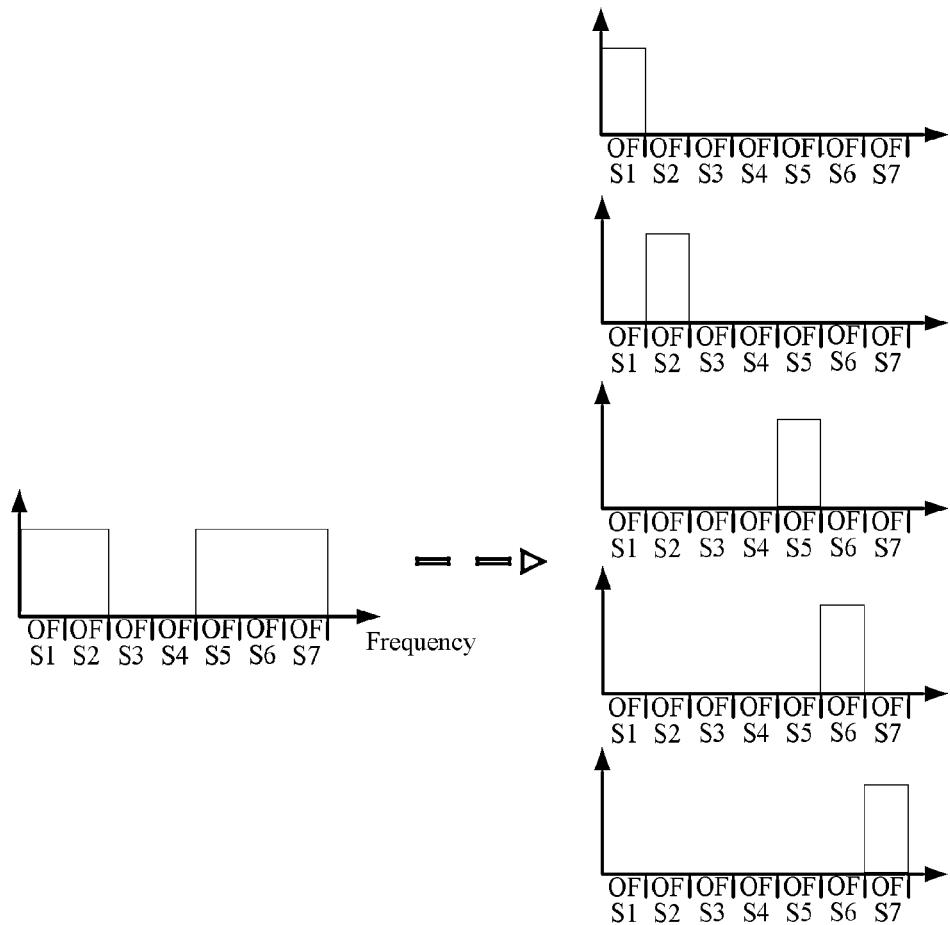
FIG. 8a is a schematic diagram of optical sub-signals split off from main optical signals according to an embodiment of the present invention.
Figure 8B:
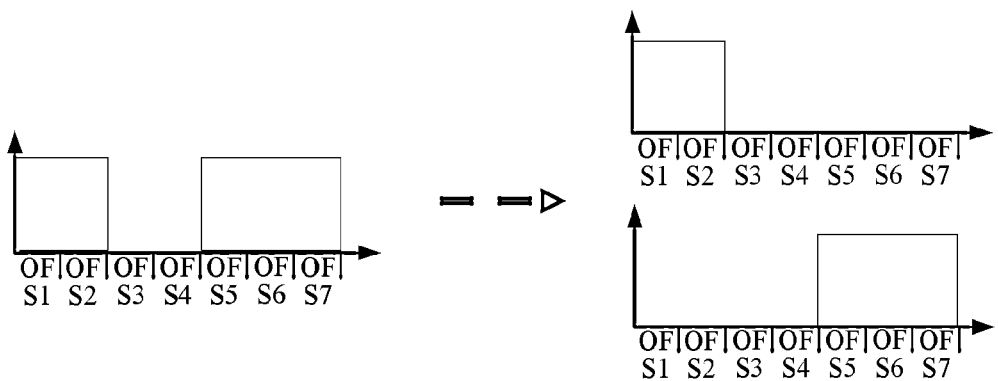
FIG. 8b is a schematic diagram of optical sub-signals split off from main optical signals according to another embodiment of the present invention.

In the incoherent reception situation, in an implementation manner, the channel of optical signals may be split, according to single OFSs occupied by the channel of optical signals, into multiple channels of optical sub-signals that occupy one OFS each. Referring to FIG. 8*a*, by using an OFS as a unit, the channel of optical signals on the left side in this figure are split into multiple channels of optical sub-signals on the right side in this figure, and each channel of optical sub-signals occupies one OFS. In another implementation manner, the channel of optical signals is split into multiple channels of optical sub-signals according to consecutive and concatenated OFS blocks occupied by the channel of optical signals. Referring to FIG. 8*b*, the channel of optical signals on the left side in this figure includes two OFS blocks, one OFS block includes OFS1 and OFS2, the other OFS block includes OFS5, OFS6, and OFS7, and the two OFS blocks are split into two channels of optical sub-signals on the right side in this figure.

In the process of splitting main optical signals, the split manner and process are controlled by acquiring instruction information from an interface of a control/management plane.

For another example, in the coherent reception situation, at least one local oscillator light source may be selected according to OFSs occupied by the optical signals, and the local oscillator light source and the channel of optical signals may be mixed so as to generate multiple channels of mixed optical sub-signals. Preferably, there are also two implementation manners herein. In one implementation manner, at least one local oscillator light source is selected according to single optical frequency slots occupied by the channel of optical signals, and the local oscillator light source and the channel of optical signals are mixed so as to generate multiple channels of mixed optical sub-signals. In a simple situation, a corresponding number of local oscillator light sources may be selected in one-to-one correspondence for each OFS of the optical signals. Definitely, several OFSs may also share one local oscillator light source according to a reception algorithm and a requirement on reception performance. In another implementation manner, at least one local oscillator light source is selected according to consecutive and concatenated optical frequency slot blocks occupied by the channel of optical signals, and the local oscillator light source and the channel of optical signals are mixed so as to generate mixed optical signals. In a simple situation, one local oscillator light source may be selected correspondingly for each of the consecutive and concatenated OFS blocks. Definitely, several consecutive and concatenated OFS blocks may also share one local oscillator light source according to a reception algorithm and a requirement on reception performance.

Step 73: Demodulate data information from the multiple channels of optical sub-signals.

In the incoherent reception situation, after the channel of optical signals is split into multiple channels of optical sub-signals according to the OFSs occupied by the channel of optical signals, the multiple channels of optical sub-signals are separately converted into corresponding analog electrical signals, the analog electrical signals are converted into corresponding digital signals, and the data information is restored from the digital signals to complete the transmission of the data information.

In the coherent reception situation, the multiple channels of optical sub-signals generated after the mixing are converted into corresponding analog electrical signals, the analog electrical signals are converted into corresponding digital signals, and the data information is restored from the digital signals to complete the transmission of the data information.

According to an embodiment of the present invention, after the channel of optical signals is sent and/or before the channel of optical signals is received, cross transmission may also be performed for at least once for the channel of optical signals as a whole. Here, the cross transmission includes: scheduling the channel of optical signals as a whole from an input optical fiber of an intermediate node to an output optical fiber of the intermediate node. This overall transmission ensures that the data information transmitted by using the channel of optical signals is complete. Here, the intermediate node is a node that the channel of optical signals sent from a sending node passes through before reaching a receiving node. The input optical fiber and the output optical fiber may be line fibers or local fibers.

In another implementation situation, during transmission, valid carriers corresponding to a channel of optical signals are not necessarily transmitted through a same path or optical fiber, but may be transmitted through different paths or optical fibers and then received together at a receiving end. The channel of optical signals occupies at least two OFSs, and a vacant OFS or an OFS occupied by other optical signals exists between the two OFSs.

According to this embodiment of the present invention, the channel of optical signals occupies at least two OFSs, and a vacant OFS or an OFS used by other optical signals exists between the two OFSs. Therefore, during the transmission, cross transmission may be performed for the channel of optical signals and optical signals formed by optical carriers onto which other data information is modulated. In this case, flexible arrangement may be performed according to the size of an OFS block, so that spectra in an optical fiber are arranged closely, thereby reducing OFS fragments, and increasing the utilization of the spectra in the optical fiber.

Embodiments of the present invention further separately provide a sending node, an intermediate node, and a receiving node.

Figure 9:
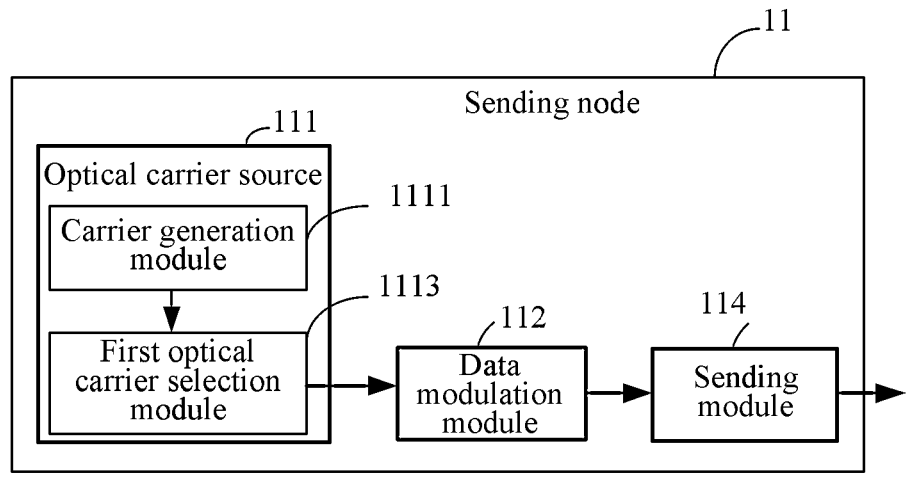
FIG. 9 is a schematic structural diagram of an embodiment of a sending node according to the present invention.

FIG. 9 shows a schematic structural diagram of a sending node 11 according to an embodiment of the present invention. As can be seen from this figure, the sending node 11 includes an optical carrier source 111, a data modulation module 112, and a sending module 114, where the optical carrier source 111 includes a carrier generation module 1111 and a first optical carrier selection module 1113, where the carrier generation module 1111 is configured to generate multiple optical carriers, and the first optical carrier selection module 1113 is configured to select at least two optical carriers from the multiple optical carriers, where the at least two optical carriers correspond to at least two optical frequency slots, and a vacant optical frequency slot or an optical frequency slot occupied by other optical signals exists between the two optical frequency slots; the data modulation module 112 is configured to modulate data information onto the at least two optical carriers to form a channel of optical signals, so that the channel of optical signals occupies the at least two optical frequency slots, and a vacant optical frequency slot or an optical frequency slot occupied by other optical signals exists between the two optical frequency slots; and the sending module 114 is configured to send the channel of optical signals.

Figure 10:
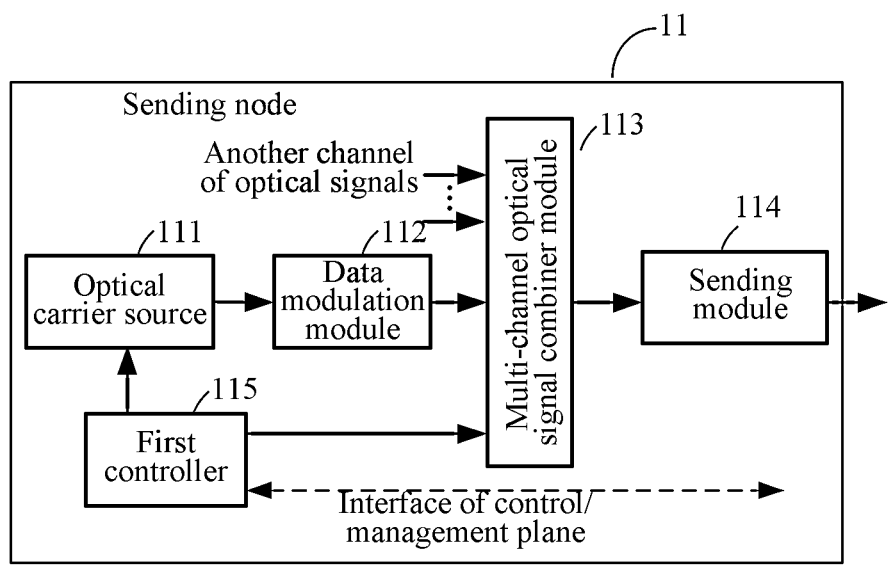
FIG. 10 is a schematic structural diagram of another embodiment of a sending node according to the present invention.

FIG. 10 shows a schematic structural diagram of a sending node according to another embodiment of the present invention. A major difference between this embodiment and the embodiment shown in FIG. 9 lies in the following: The sending node shown in the embodiment in FIG. 9 is capable of transmitting only one channel of optical signals, while the sending node 11 in this embodiment has a capability of simultaneously transmitting multiple channels of optical signals.

Referring to FIG. 10, the sending node 11 includes multiple groups of optical carrier sources 111 that are connected in sequence (only one optical carrier source is shown in this figure) and a data modulation module 112. The sending node 11 further includes a multi-channel optical signal combiner module 113 connected to multiple data modulation modules 112, a sending module 114, and a first controller 115. The first controller 115 controls, by using an interface of a control/management plane and according to a requirement of the control/management plane, a first optical carrier selection module 1113 (not shown in this figure) included in the optical carrier source 111 and the multi-channel optical signal combiner module 113. In addition, the first controller 115 may further interact with the control/management plane by using the interface of the control/management plane, including making an application, responding signaling, and so on.

The multi-channel optical signal combiner module 113 is configured to combine, before the channel of optical signals is sent, the channel of optical signals and optical signals formed by optical carriers onto which other data information is modulated.

A person skilled in the art should understand that, in channels of optical signals generated by the sending node 11 in the present invention, all the optical signals may be the channel of optical signals that occupies at least two OFSs, where a vacant OFS or an OFS used by other optical signals exists between the two OFSs, or a part of the optical signals may be the channel of optical signals.

Figure 11:
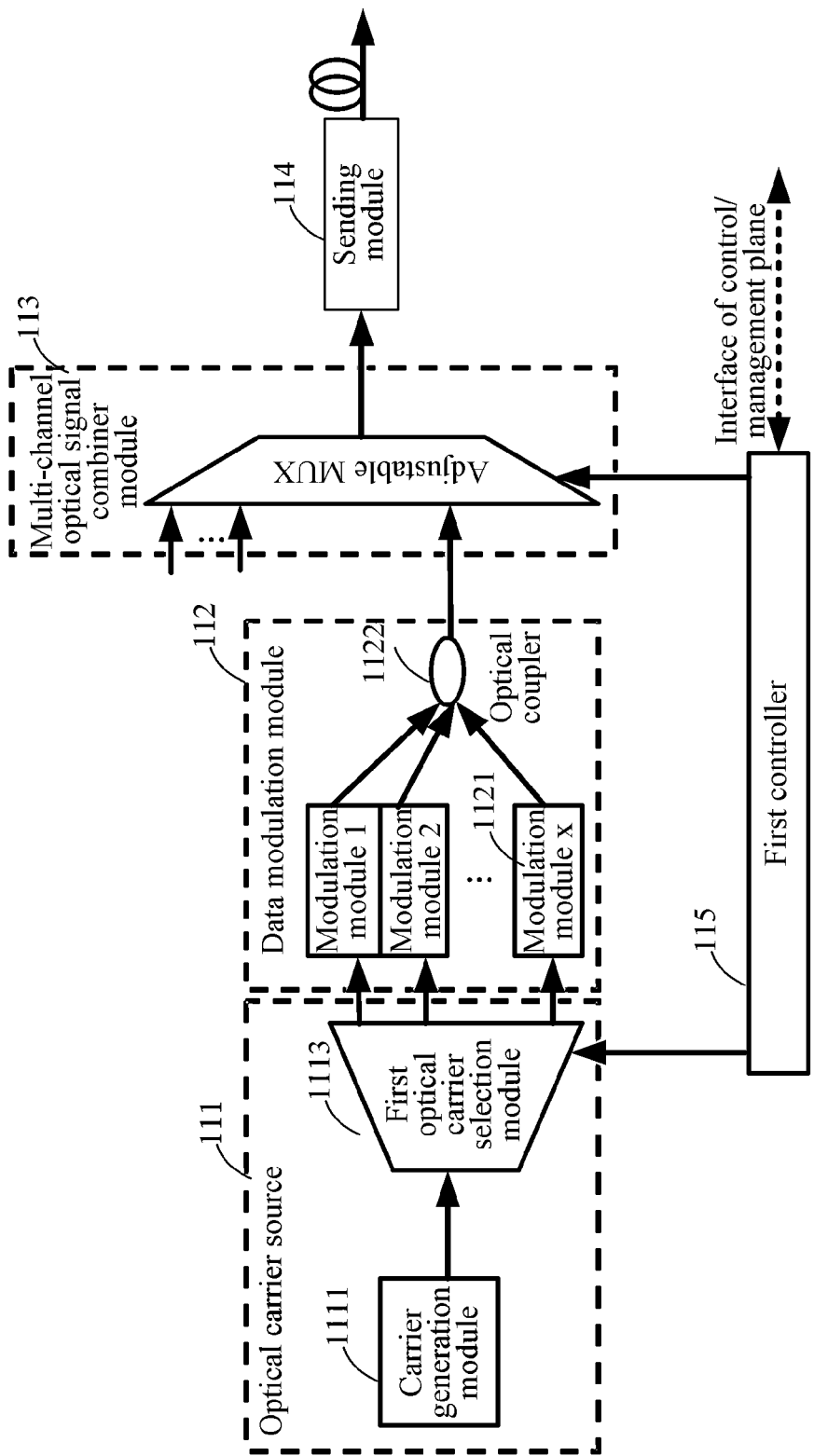
FIG. 11 is a schematic structural diagram of another embodiment of a sending node according to the present invention.

FIG. 11 shows a specific schematic diagram of a sending node according to another embodiment of the present invention.

As can be seen from this figure, in the sending node, the optical carrier source 111 includes a carrier generation module 1111 and a first optical carrier selection module 1113, where the carrier generation module 1111 is configured to generate multiple optical carriers; and the first optical carrier selection module 1113 is configured to select at least two optical carriers from the multiple optical carriers, where the at least two optical carriers correspond to at least two optical frequency slots, and a vacant optical frequency slot or an optical frequency slot occupied by other optical signals exists between the two optical frequency slots. The first optical carrier selection module 1113 may be implemented by an adjustable demultiplexer (Demultiplexer, DeMUX) module. The adjustable DeMUX may select at least two optical carriers, and a vacant OFS or an OFS occupied by other optical signals exists between OFSs corresponding to the two optical carriers. The adjustable DeMUX may be a DeMUX based on a liquid crystal on silicon (Liquid Crystal on Silicon, LCoS) technology or a wavelength selective switch (Wavelength Selective Switch, WSS) of micro-electromechanical systems (Micro-electromechanical Systems, MEMS).

In addition, it may also be seen that the data modulation module 112 includes at least one modulation module 1121 and an optical coupler 1122, where the modulation module 1121 is configured to receive an optical carrier, modulate data information onto the optical carrier to be transmitted to the optical coupler 1122, and the optical coupler 1122 is configured to combine received output signals of the at least one modulation module 1121 so as to form a channel of optical signals. Each optical carrier modulation manner may be amplitude modulation or quadrature amplitude modulation (Quadrature Amplitude Modulation, QAM).

The multi-channel optical signal combiner module 113 may be implemented by an adjustable multiplexer (Multiplexer, MUX) module. The adjustable MUX is a MUX based on the LCoS technology. The adjustable MUX is capable of combining the optical signals output by the data modulation module 112 as a whole, where a spectrum corresponding to the optical signals occupies at least two OFSs, and a vacant OFS or an OFS used by other optical signals exists between the two OFSs.

In addition, the first controller 115 is configured to acquire a control instruction from an interface of a control/management plane, control the optical carrier source 111 to select an optical carrier, and control and/or configure the multi-channel optical signal combiner module 113. The first controller 115 may further interact with the control/management plane by using the interface of the control/management plane, including making an application, responding signaling, and so on. Information about the interface of the control/management plane may be modulated, together with data information that needs to be transmitted, onto a carrier, or may use an independent carrier.

The sending module 114 is configured to send the combined optical signals output by the multi-channel optical signal combiner module 113.

Figure 12:
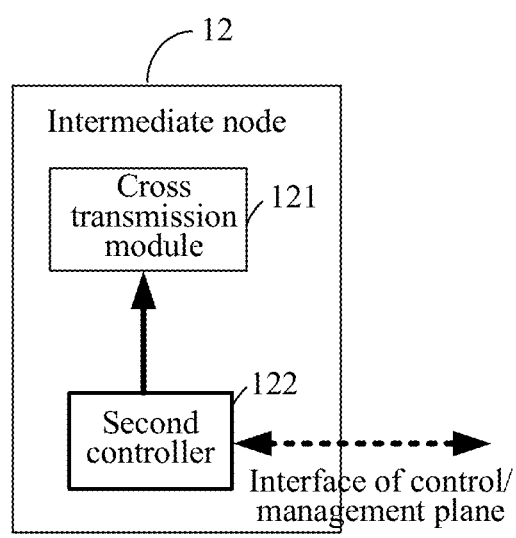
FIG. 12 is a schematic structural diagram of an embodiment of an intermediate node according to the present invention.

FIG. 12 shows a schematic structural diagram of an intermediate node 12 according to an embodiment of the present invention. As can be seen from this figure, the intermediate node 12 includes at least one cross transmission module 121, where the cross transmission module 121 is configured to extract a channel of optical signals as a whole from an input optical fiber at an optical layer, and/or schedule the channel of optical signals as a whole from the input optical fiber to an output optical fiber at the optical layer, and/or combine the channel of optical signals as a whole into the output optical fiber at the optical layer, a spectrum corresponding to the channel of optical signals occupies at least two optical frequency slots OFSs, and a vacant OFS or an OFS used by other optical signals exists between the two OFSs. In addition, the intermediate node further includes a second controller 122, configured to control and/or configure the cross transmission module 121 according to a requirement of a control/management plane. Meanwhile, the second controller 122 may further interact with the control/management plane by using an interface of the control/management plane, including making an application, responding signaling, and so on. Information about the interface of the control/management plane may be modulated, together with data information that needs to be transmitted, onto a carrier, or may use an independent carrier.

Figure 13:
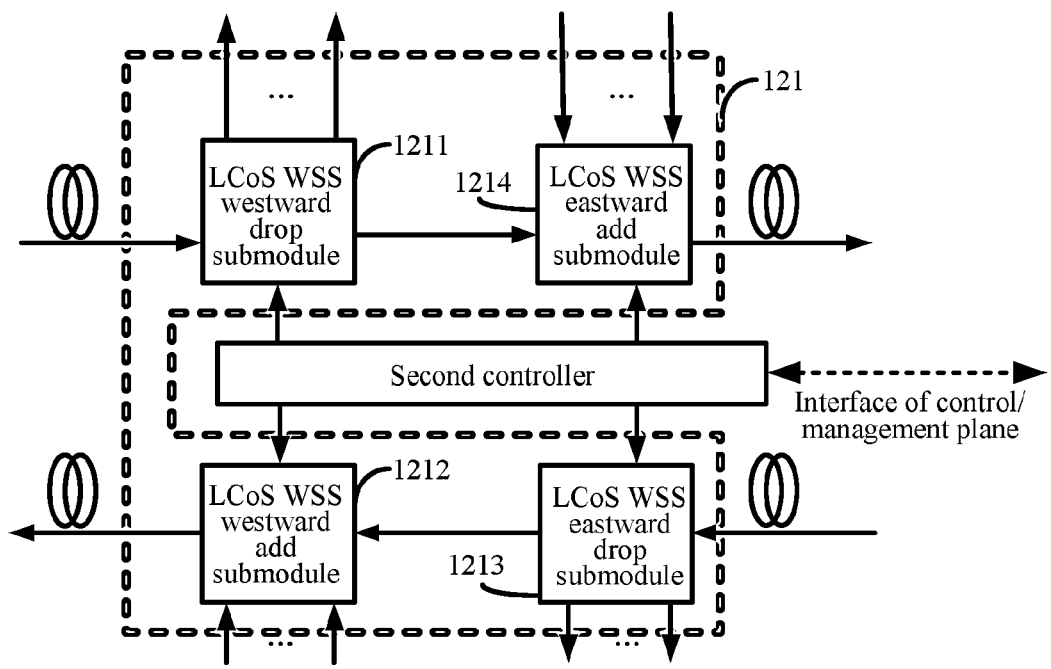
FIG. 13 is a schematic structural diagram of a cross transmission module according to an embodiment of the present invention.

FIG. 13 shows a schematic structural diagram of a cross transmission module 121 according to an embodiment of the present invention. As can be seen from this figure, the cross transmission module 121 includes an LCoS WSS westward drop submodule 1211, an LCoS WSS westward add submodule 1212, an LCoS WSS eastward drop submodule 1213, and an LCoS WSS eastward add submodule 1214.

The LCoS WSS westward drop submodule 1211 is configured to split off local westward dropped optical signals from a westward input line fiber and transmit the remaining optical signals to the LCoS WSS eastward add submodule 1214.

The LCoS WSS eastward add submodule 1214 is configured to combine local eastward added optical signals and the optical signals transmitted by the LCoS WSS westward drop submodule 1211 and transmit the combined optical signals to an eastward output optical fiber.

The LCoS WSS eastward drop submodule 1213 is configured to split off local eastward dropped optical signals from an eastward input line fiber and transmit the remaining optical signals to the LCoS WSS westward add submodule 1212.

The LCoS WSS westward add submodule 1212 is configured to combine local westward added optical signals and the optical signals transmitted by the LCoS WSS eastward drop submodule 1213 and transmit the combined optical signals to a westward output optical fiber.

These LCoS WSS submodules are capable of switching such optical signals as a whole according to control signals of the second controller 122: a spectrum corresponding to the optical signals occupies at least two optical frequency slots OFSs and a vacant OFS or an OFS used by other optical signals exists between the two OFSs. In addition, the second controller 122 may control and/or configure, by using an interface of a control/management plane, the LCoS WSS submodules according to a requirement of the control/management plane.

A person skilled in the art should know that in the present invention, a cross transmission module 121 may be selected, or according to a practical engineering requirement, transmission submodules in other directions may be set, such as an LCoS WSS southward add submodule, an LCoS WSS southward drop submodule, an LCoS WSS northward add submodule, and an LCoS WSS northward drop submodule, and their functions are similar to the submodules in this embodiment shown in FIG. 13. No further details are provided herein.

Figure 14:
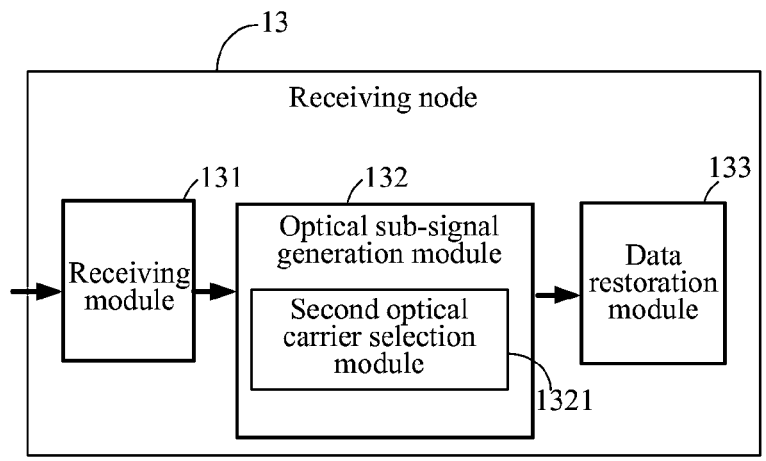
FIG. 14 is a schematic structural diagram of an embodiment of an incoherent receiving node according to the present invention.

FIG. 14 shows a schematic structural diagram of a receiving node 13 according to an embodiment of the present invention. This embodiment corresponds to the embodiment of the sending node shown in FIG. 9, and the receiving node 13 is designed for an incoherent reception situation. The receiving node 13 includes: a receiving module 131, configured to receive a channel of optical signals, where the channel of optical signals occupies at least two optical frequency slots, and a vacant optical frequency slot or an optical frequency slot occupied by other optical signals exists between the two optical frequency slots; an optical sub-signal generation module 132, configured to generate multiple channels of optical sub-signals from the channel of optical signals according to the optical frequency slots occupied by the channel of optical signals; and a data restoration module 133, configured to demodulate data information from the multiple channels of optical sub-signals.

As can be seen from FIG. 14, in the incoherent reception situation, the optical sub-signal generation module 132 further includes a second optical carrier selection module 1321, configured to split, according to single optical frequency slots occupied by the channel of optical signals, the channel of optical signals into multiple channels of optical sub-signals that occupy one optical frequency slot each, or configured to split the channel of optical signals into multiple channels of optical sub-signals according to consecutive and concatenated optical frequency slot blocks occupied by the channel of optical signals. The channel of optical signals occupies at least two optical frequency slots OFSs, and a vacant OFS or an OFS occupied by other optical signals exists between the two OFSs. A split manner for splitting the channel of received optical signals into multiple channels of optical sub-signals according to OFSs occupied by the channel of optical signals is the same as the split manner shown in FIG. 8a or FIG. 8b. No further details are provided herein.

Figure 15:
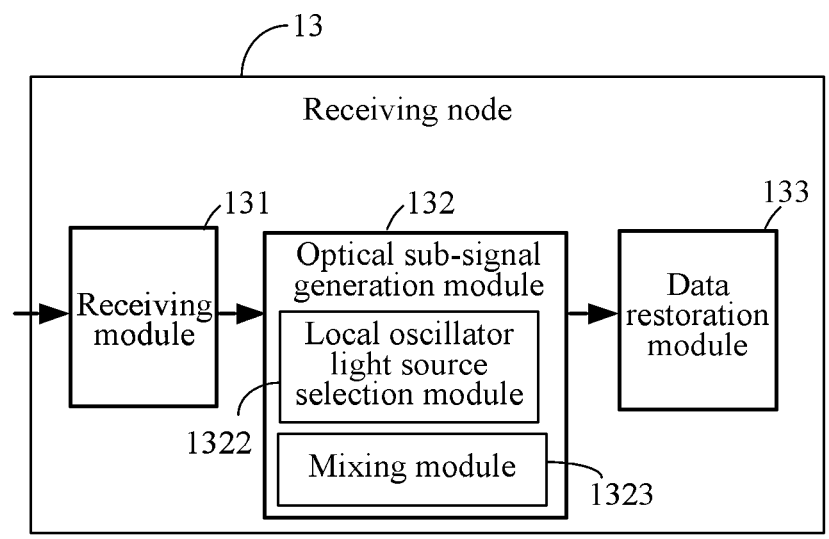
FIG. 15 is a schematic structural diagram of an embodiment of a coherent receiving node according to the present invention.

FIG. 15 shows a schematic structural diagram of a receiving node 13 according to an embodiment of the present invention. This embodiment corresponds to the embodiment of the sending node shown in FIG. 9, and the receiving node 13 is designed for a coherent reception situation.

As can be seen from FIG. 15, a difference between this situation and the incoherent reception situation lies in that in the coherent reception situation, an optical sub-signal generation module 132 further includes a local oscillator light source selection module 1322 and a mixing module 1323. The local oscillator light source selection module 1322 is configured to select at least one local oscillator light source according to single optical frequency slots occupied by the channel of optical signals, and the mixing module 1323 is configured to mix the at least one local oscillator light source and the channel of optical signals so as to generate multiple channels of mixed optical sub-signals. Alternatively, the local oscillator light source selection module 1322 is configured to select at least one local oscillator light source according to consecutive and concatenated optical frequency slot blocks occupied by the channel of optical signals, and the mixing module 1323 is configured to mix the at least one local oscillator light source and the channel of optical signals so as to generate mixed optical signals.

Figure 16:
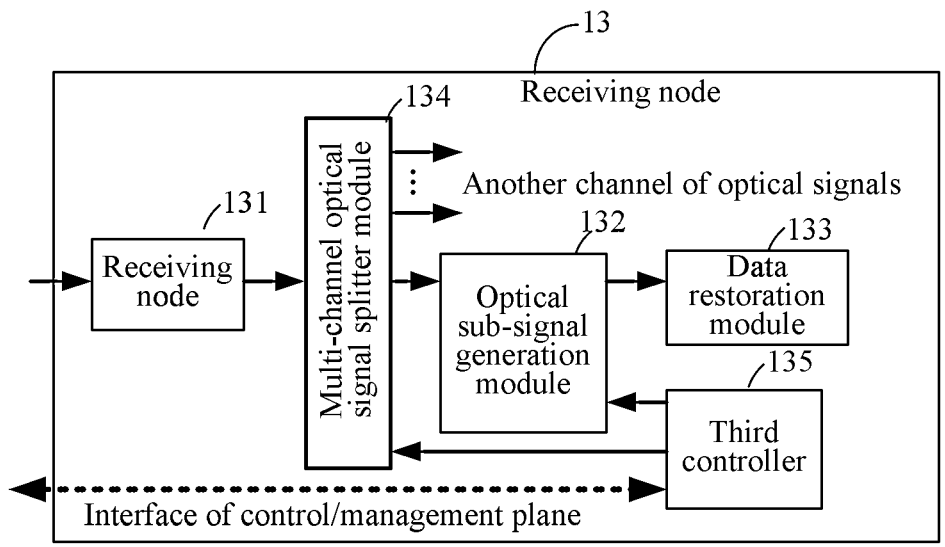
FIG. 16 is a schematic structural diagram of another embodiment of a receiving node according to the present invention.

FIG. 16 shows a schematic structural diagram of a receiving node 13 according to an embodiment of the present invention. The receiving node in this embodiment corresponds to the sending node in the embodiment shown in FIG. 10. As can be seen from this figure, the receiving node 13 includes a receiving module 131, a multi-channel optical signal splitting module 134, an optical sub-signal generation module 132, a data restoration module 133, and a third controller 135.

The multi-channel optical signal splitting module 134 is configured to split multiple channels of optical signals after receiving the optical signals, where at least one channel of optical signals occupies at least two optical frequency slots OFSs, and a vacant OFS or an OFS used by other optical signals exists between the two OFSs. The multi-channel optical signal splitting module 134 is capable of splitting the channel of optical signals as a whole and then sends the channel of optical signals to the optical sub-signal generation module 132. Functions of the optical sub-signal generation module 132 and the data restoration module 133 are the same as the functions shown in the embodiments in FIG. 14 and FIG. 15. No further details are provided herein. The third controller 135 controls operations of the optical sub-signal generation module 132 and the multi-channel optical signal splitting module 134 according to a control instruction from an interface of a control/management plane. Information about the interface of the control/management plane may be modulated, together with data information that needs to be transmitted, onto a carrier, or may use an independent carrier.

A person skilled in the art should understand that a part of output ports of the multi-channel optical signal splitting module 134 may further be directly connected to the data restoration module 133 and the multi-channel optical signal splitting module 134 may directly transmit the split at least one channel of optical signals to the data restoration module 133 to restore the data information.

Figure 17:
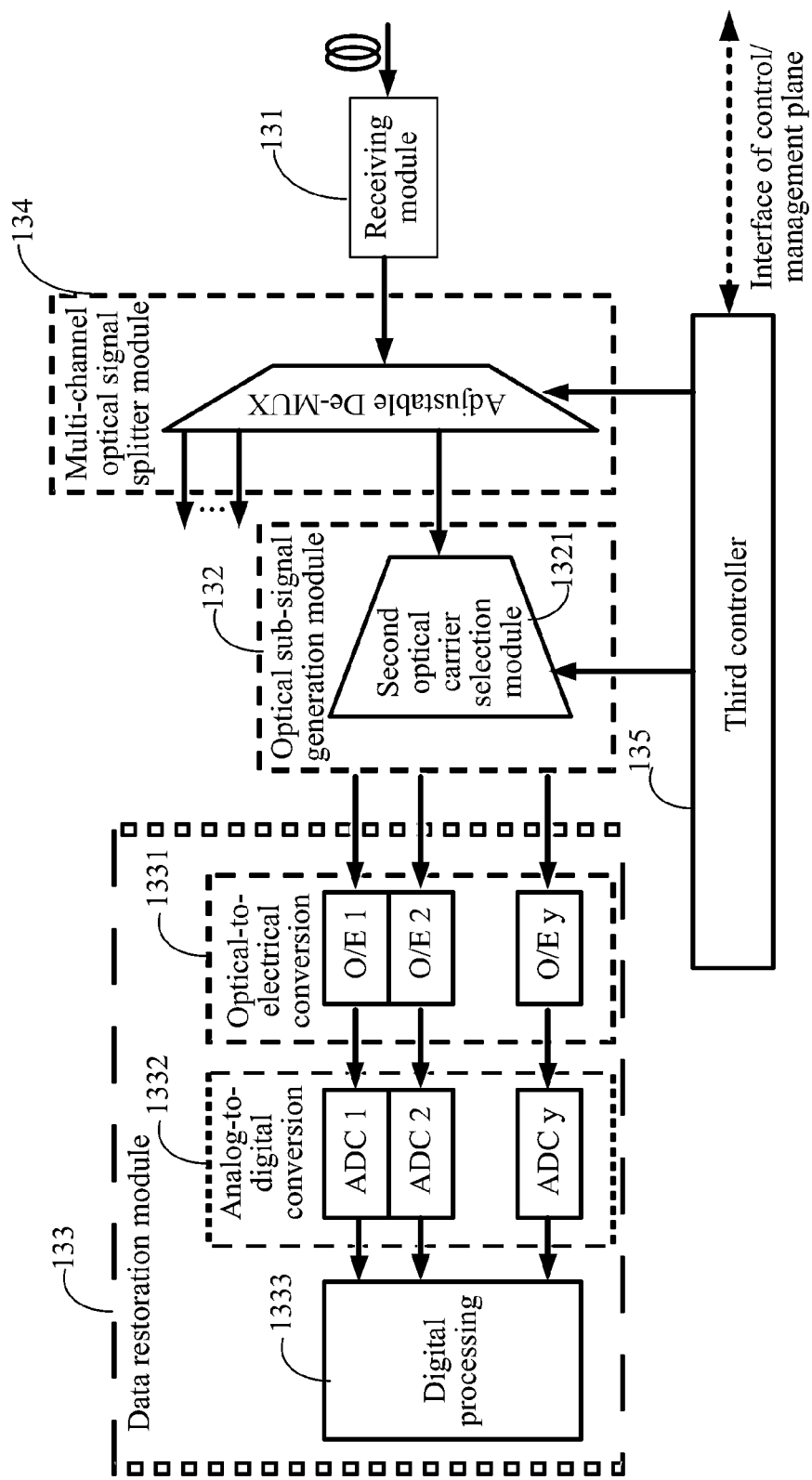
FIG. 17 is a schematic structural diagram of another embodiment of an incoherent receiving node according to the present invention.

FIG. 17 shows a specific application of the receiving node 13 in the embodiment shown in FIG. 14, where the receiving node 13 is also used in an incoherent reception situation.

A multi-channel optical signal splitting module 134 may be implemented by an adjustable DeMUX module, and may specifically be implemented by a DeMUX based on an LCoS technology, and its function is the same as the function of the multi-channel optical signal splitting module 134 described with reference to FIG. 16.

A second optical carrier selection module 131 may be implemented by an adjustable DeMUX module, and may specifically be implemented by a DeMUX based on the LCoS (Liquid Crystal on Silicon, liquid crystal on silicon) technology or a wavelength selective switch (Wavelength Selective Switch, WSS) of micro-electromechanical systems (Micro-electromechanical Systems, MEMS), and its function is the same as the function of the second optical carrier selection module 1321 described with reference to FIG. 14.

A data restoration module 133 includes an optical-to-electrical conversion submodule 1331, an analog-to-digital conversion submodule 1332, and a digital processing submodule 1333. The optical-to-electrical conversion submodule 1331 includes multiple O/E circuits and is configured to convert multiple channels of optical sub-signals into multiple channels of analog electrical signals. An O/E module implements an optical-to-electrical conversion. Specifically, the O/E module may be a positive intrinsic-negative (Positive Intrinsic-Negative, PIN) photodiode or an avalanche photodiode (Avalanche Photodiode, APD).

The analog-to-digital conversion submodule 1332 includes multiple analog to digital converter (Analog to Digital Converter, ADC) circuits and is configured to convert analog signals into digital signals. The digital processing submodule 1333 is configured to extract data information from the digital signals.

Figure 18:
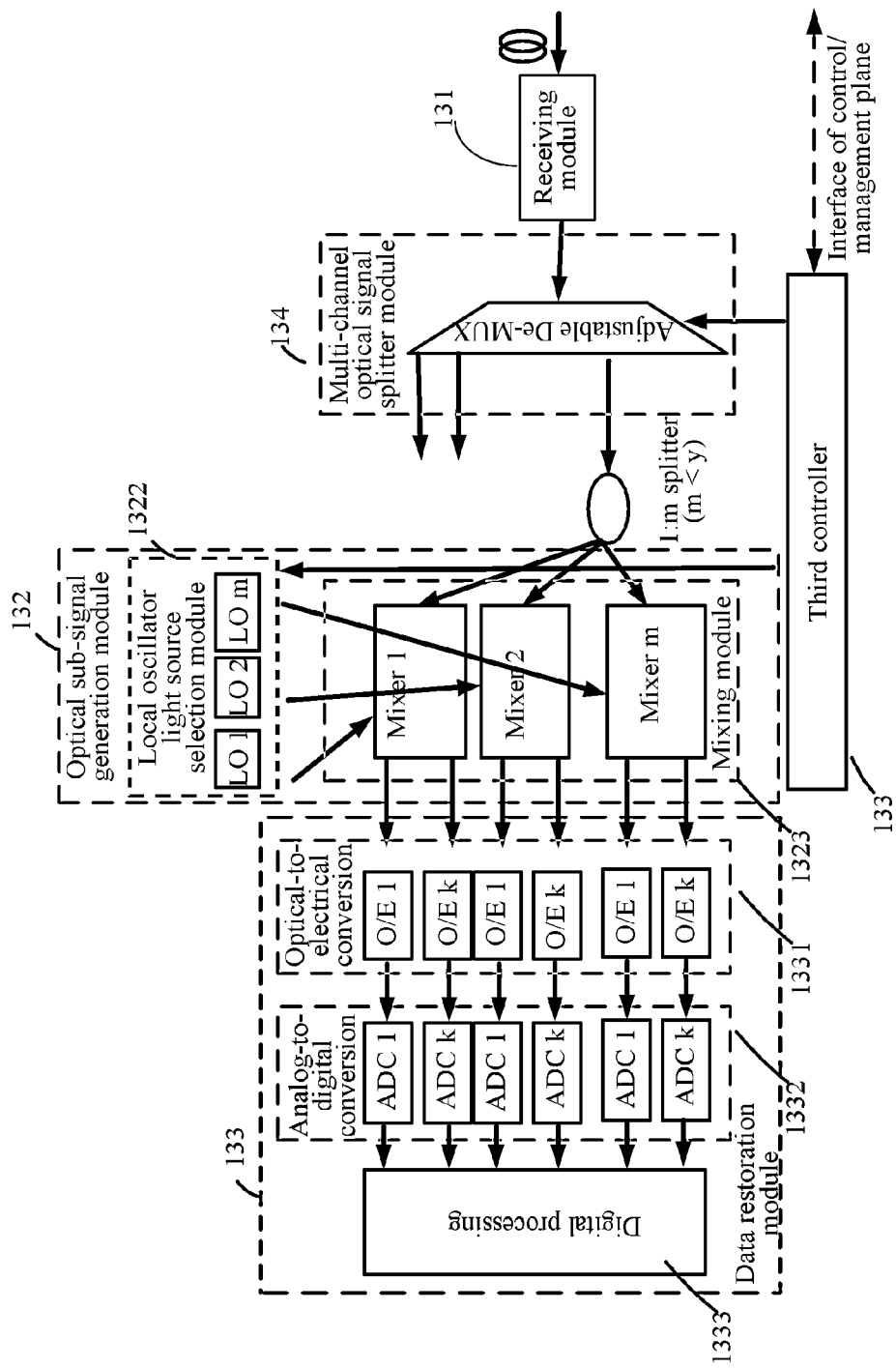
FIG. 18 is a schematic structural diagram of an embodiment of a coherent receiving node according to the present invention.

FIG. 18 shows a specific application of the receiving node 13 in the embodiment shown in FIG. 15, where the receiving node 13 is also used in a coherent reception situation.

As can be seen from this figure, an optical sub-signal generation module 132 further includes a local oscillator light source selection module 1322 and a mixing module 1323. Their functions are the same as the functions described with reference to FIG. 15. No further details are provided herein.

A data restoration module 133 includes an optical-to-electrical conversion submodule 1331, an analog-to-digital conversion submodule 1332, and a digital processing submodule 1333, where the optical-to-electrical conversion submodule 1331 is configured to convert the multiple channels of mixed optical signals into multiple channels of analog electrical signals, the analog-to-digital conversion submodule 1332 is configured to convert the multiple channels of analog electrical signals into digital signals, and the digital processing submodule 1333 is configured to extract data information from the digital signals.

In FIG. 18, the local oscillator light source selection module 1322 is configured to select a parameter such as a wavelength of a local oscillator light source corresponding to each mixer. For flexible configuration, the local oscillator light source may be an optical source whose wavelength is adjustable. In FIG. 18, after being output from a multi-channel optical signal splitting module 134, a channel of optical signals passes through a 1:m splitter and is split into m channels, where m may be determined according to the number of OFSs or OFS blocks separated one by one and a receiving manner. In a simple situation, a corresponding number of local oscillator light sources may be selected in one-to-one correspondence for each OFS of the optical signals or one local oscillator light source may be selected correspondingly for each of the consecutive and concatenated OFS blocks. Definitely, according to a reception algorithm and a requirement on reception performance, several OFSs may also share one local oscillator light source or several consecutive and concatenated OFS blocks may share one local oscillator light source. Then, the mixer is used to mix each channel of optical signals, and the optical-to-electrical conversion and the analog-to-digital conversion are performed, and so on. k optical-to-electrical converters and ADCs are used for each channel of mixed signals, where k is relevant to a modulation format.

Figure 19:
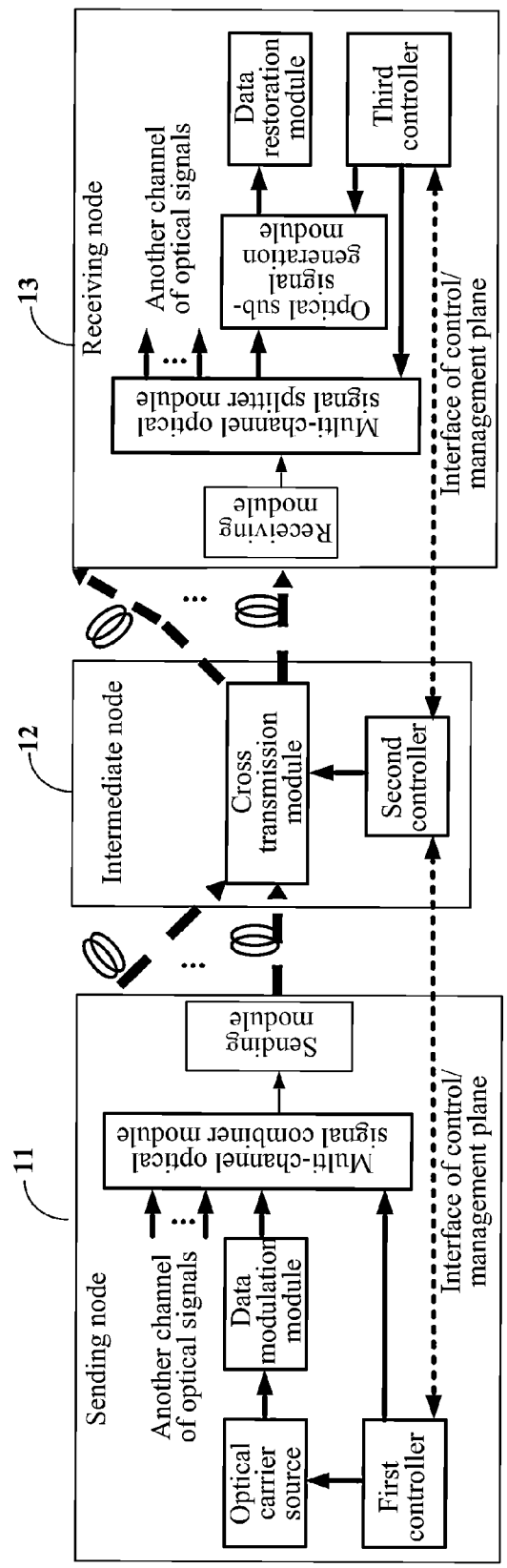
FIG. 19 is a schematic structural diagram of a system for transmitting data information by using optical signals according to an embodiment of the present invention.

FIG. 19 shows a system for transmitting data information by using optical signals according to an embodiment of the present invention. As can be seen from this figure, the system includes a sending node 11 and a receiving node 13, and optionally further includes an intermediate node 12. Specific content of the sending node 11, the receiving node 13, and the intermediate node 12 has been described in detail above. No further details are provided herein.

According to the system in this embodiment of the present invention, at least one channel of optical signals occupies at least two optical frequency slots (OFS), and a vacant OFS or an OFS used by other optical signals exists between the two OFSs. Therefore, during the transmission, flexible arrangement may be performed according to the size of an OFS block in the channel of optical signals, so that spectra of the optical signals in an optical fiber are arranged closely, thereby increasing the utilization of the spectra in the optical fiber.

A person skilled in the art should understand that the division of the apparatuses and modules in the embodiments of the present invention is functional divisions and their practical specific structures may be a split or combination of the foregoing functional modules.

The sequence numbers of the preceding embodiments of the present invention are merely for description but do not indicate the preference of the embodiments.

Solutions described in claims also fall within the protection scope of the embodiments of the present invention.

A person skilled in the art should understand that all or a part of the processes of the methods in the embodiments may be implemented by a program instructing relevant hardware. The program may be stored in a computer readable storage medium.

The foregoing describes only exemplary embodiments of the present invention and is not intended to limit the protection scope of the present invention. Any modification, equivalent replacement, or improvement made within the spirit and principle of the present invention shall fall within the protection scope of the present invention.

What is claimed is:

1. A method for transmitting data information, comprising:
    selecting at least two optical carriers, wherein the at least two optical carriers correspond to at least two optical frequency slots;
    modulating first data information onto the at least two optical carriers to form a first channel of optical signal, so that the first channel of optical signal occupies the at least two optical frequency slots, and an optical frequency slot occupied by a second channel of optical signal carrying second data information exists between the at least two optical frequency slots, wherein the second data information is modulated onto optical carriers of the second channel of optical signal, wherein the at least two optical carriers need to be received together in the receiving end of the first channel of optical signal to correctly recover the first data information carried by the first channel of optical signal, all of the optical carriers of the second channel of optical signal need to be received together in the receiving end of the second channel of optical signal to correctly recover the second data information; and
    sending the first channel of optical signal.

2. The method according to claim 1, further comprising:
    performing cross connection for the first channel of optical signal and the second channel of optical signal.

3. The method according to claim 1, wherein consecutive and concatenated optical frequency slot blocks exist in the optical frequency slots occupied by the first channel of optical signal.

4. A method for receiving data information, comprising:
    receiving a first channel of optical signal, wherein the first channel of optical signal occupies at least two optical frequency slots, and an optical frequency slot occupied by a second channel of optical signal carrying second data information exists between the at least two optical frequency slots, wherein the second data information is modulated onto optical carriers of the second channel of optical signal, wherein the at least two optical carriers need to be received together in the receiving end of the first channel of optical signal to correctly recover first data information carried by the first channel of optical signal, all of the optical carriers of the second channel of optical signal need to be received together in the receiving end of the second channel of optical signal to correctly recover the second data information;
    generating multiple channels of optical sub-signals from the first channel of optical signal according to the optical frequency slots occupied by the first channel of optical signal; and
    demodulating the first data information from the multiple channels of optical sub-signals.

5. The method according to claim 4, wherein the generating multiple channels of optical sub-signals from the first channel of optical signal according to the optical frequency slots occupied by the first channel of optical signal further comprises:
    splitting, according to single optical frequency slots occupied by the first channel of optical signal, the first channel of optical signal into multiple channels of optical sub-signals that occupy one optical frequency slot each.

6. The method according to claim 4, wherein the generating multiple channels of optical sub-signals from the first channel of optical signal according to the optical frequency slots occupied by the first channel of optical signal further comprises:
    splitting the first channel of optical signal into multiple channels of optical sub-signals according to consecutive and concatenated optical frequency slot blocks occupied by the first channel of optical signal.

7. The method according to claim 4, wherein the generating multiple channels of optical sub-signals from the first channel of optical signal according to the optical frequency slots occupied by the first channel of optical signal further comprises:
    selecting at least one local oscillator light source according to single optical frequency slots occupied by the first channel of optical signal, and mixing the local oscillator light source and the first channel of optical signal so as to generate multiple channels of mixed optical sub-signals.

8. The method according to claim 4, wherein the generating multiple channels of optical sub-signals from the first channel of optical signal according to the optical frequency slots occupied by the first channel of optical signal further comprises:

selecting at least one local oscillator light source according to consecutive and concatenated optical frequency slot blocks occupied by the first channel of optical signal, and mixing the local oscillator light source and the first channel of optical signal so as to generate mixed optical signals.

9. A sending node, comprising an optical carrier source, a data modulation module, and a sending module, wherein:

the optical carrier source comprises a carrier generation module and a first optical carrier selection module, wherein the carrier generation module is configured to generate multiple optical carriers, and the first optical carrier selection module is configured to select at least two optical carriers from the multiple optical carriers, wherein the at least two optical carriers correspond to at least two optical frequency slots;

the data modulation module is configured to modulate first data information onto the at least two optical carriers to form a first channel of optical signal, so that the first channel of optical signal occupies the at least two optical frequency slots, and an optical frequency slot occupied by a second channel of optical signal carrying second data information exists between the two optical frequency slots, wherein the second data information is modulated onto optical carriers of the second channel of optical signal, wherein the at least two optical carriers need to be received together in the receiving end of the first channel of optical signal to correctly recover the first data information carried by the first channel of optical signal, all of the optical carriers of the second channel of optical signal need to be received together in the receiving end of the second channel of optical signal to correctly recover the second data information; and the sending module is configured to send the first channel of optical signal.

10. The sending node according to claim 9, further comprising a multi-channel optical signal combiner module, configured to combine the first channel of optical signal and the second channel of optical signal.

11. The sending node according to claim 9, wherein consecutive and concatenated optical frequency slot blocks exist in the optical frequency slots occupied by the first channel of optical signal.

12. A receiving node, comprising:

a receiving module, configured to receive a first channel of optical signal, wherein the first channel of optical signal occupies at least two optical frequency slots, and an optical frequency slot occupied by a second channel of optical signal carrying second data information exists between the at least two optical frequency slots, wherein the second data information is modulated onto optical carriers of the second channel of optical signal, wherein the at least two optical carriers need to be received together in the receiving end of the first channel of optical signal to correctly recover first data information carried by the first channel of optical signal, all of the optical carriers of the second channel of optical signal need to be received together in the receiving end of the second channel of optical signal to correctly recover the second data information;

an optical sub-signal generation module, configured to generate multiple channels of optical sub-signals from the first channel of optical signal according to the optical frequency slots occupied by the first channel of optical signal; and a data restoration module, configured to demodulate the first data information from the multiple channels of optical sub-signals.

13. The receiving node according to claim 12, wherein the optical sub-signal generation module further comprises a second optical carrier selection module, configured to split, according to single optical frequency slots occupied by the first channel of optical signal, the first channel of optical signal into multiple channels of optical sub-signals that occupy one optical frequency slot each.

14. The receiving node according to claim 12, wherein the optical sub-signal generation module further comprises a second optical carrier selection module, configured to split the first channel of optical signal into multiple channels of optical sub-signals according to consecutive and concatenated optical frequency slot blocks occupied by the first channel of optical signal.

15. The receiving node according to claim 12, wherein the optical sub-signal generation module further comprises a local oscillator light source selection module and a mixing module, wherein the local oscillator light source selection module is configured to select at least one local oscillator light source according to single optical frequency slots occupied by the first channel of optical signal, and the mixing module is configured to mix the at least one local oscillator light source and the first channel of optical signal to generate multiple channels of mixed optical sub-signals.

16. The receiving node according to claim 12, wherein the optical sub-signal generation module further comprises a local oscillator light source selection module and a mixing module, wherein the local oscillator light source selection module is configured to select at least one local oscillator light source according to consecutive and concatenated optical frequency slot blocks occupied by the first channel of optical signal, and the mixing module configured to mix the at least one local oscillator light source and the first channel of optical signal to generate mixed optical signals.

17. A system for transmitting data information, comprising a sending node and a receiving node, the sending node, comprising a first optical carrier source, a data modulation module, and a sending module, wherein:

the first optical carrier source comprises a carrier generation module and a first optical carrier selection module, wherein the carrier generation module is configured to generate multiple optical carriers, and the first optical carrier selection module is configured to select at least two optical carriers from the multiple optical carriers, wherein the at least two optical carriers correspond to at least two optical frequency slots;

the data modulation module is configured to modulate first data information onto the at least two optical carriers to form a first channel of optical signal, so that the first channel of optical signal occupies the at least two optical frequency slots, and an optical frequency slot occupied by second channel of optical signal carrying second data information exists between the two optical frequency slots, wherein the second data information is modulated onto optical carriers of the second channel of optical signal, wherein the at least two optical carriers need to be received together in the receiving end of the first channel of optical signal to correctly recover the first data information carried by the first channel of optical signal, all of the optical carriers of the second channel of optical signal need to be received together in the receiving end of the second channel of optical signal to correctly recover the second data information; and the sending module is configured to send the first channel of optical signal; and the receiving node, comprising:

a receiving module, configured to receive a third channel of optical signal, wherein the third channel of optical signal occupies at least two optical frequency slots, and an optical frequency slot occupied by a fourth channel of optical signal carrying fourth data information exists between the at least two optical frequency slots;

an optical sub-signal generation module, configured to generate multiple channels of optical sub-signals from the third channel of optical signal according to the optical frequency slots occupied by the third channel of optical signal; and a data restoration module, configured to demodulate third data information from the multiple channels of optical sub-signals.

18. The system according to claim 17, further comprising an intermediate node, wherein the intermediate node is configured to schedule the first channel of optical signal as a whole from an input optical fiber of the intermediate node to an output optical fiber of the intermediate node.

* * * * *